United States Patent
Tsai et al.

(10) Patent No.: US 8,659,881 B2
(45) Date of Patent: Feb. 25, 2014

(54) POWER DISTRIBUTION UNIT FOR RECEIVING DIVERSIFIED THREE-PHASE POWER OR SINGLE-PHASE POWER

(75) Inventors: Sheng-Nan Tsai, Taoyuan Hsien (TW); Shin-Chang Wu, Taoyuan Hsien (TW); Yung-Sheng Yeh, Taoyuan Hsien (TW); Jia-Li Tsai, Taoyuan Hsien (TW); Chuang-Huan Chiu, Taoyuan Hsien (TW)

(73) Assignee: Delta Electronics, Inc., Taoyan Hsien (TW)

( * ) Notice: Subject to any disclaimer, the term of this patent is extended or adjusted under 35 U.S.C. 154(b) by 282 days.

(21) Appl. No.: 12/896,290

(22) Filed: Oct. 1, 2010

(65) Prior Publication Data

US 2011/0080693 A1 Apr. 7, 2011

(30) Foreign Application Priority Data

Oct. 2, 2009 (TW) .............................. 98133598 A

(51) Int. Cl.
*H05K 7/20* (2006.01)
(52) U.S. Cl.
USPC .......................................... 361/637; 361/624
(58) Field of Classification Search
USPC .................. 361/624, 634, 637, 641, 648–652
See application file for complete search history.

(56) References Cited

U.S. PATENT DOCUMENTS

| | | | |
|---|---|---|---|
| 5,675,194 A * | 10/1997 | Domigan | 307/147 |
| 5,737,194 A * | 4/1998 | Hopkins et al. | 361/800 |
| 6,442,017 B1 * | 8/2002 | Ewing et al. | 361/628 |
| 6,624,997 B1 * | 9/2003 | Llanos et al. | 361/111 |
| 8,081,422 B2 * | 12/2011 | Shannon et al. | 361/624 |
| 2007/0281526 A9 | 12/2007 | Donahue | |
| 2011/0304966 A1 * | 12/2011 | Schrempp | 361/679.4 |

FOREIGN PATENT DOCUMENTS

TW M257568 2/2005
TW 200843279 11/2008

* cited by examiner

*Primary Examiner* — Courtney Smith
(74) *Attorney, Agent, or Firm* — Evan R. Witt; Kirton McConkie

(57) ABSTRACT

A power distribution unit is provided for receiving diversified three-phase power or single-phase power. The power distribution unit includes a separable power cord and a separable wiring block. The separable power cord is used for receiving electric energy of input power. The separable wiring block is electrically connected with the power cord for providing at least one connection configuration. The connection configuration provided by one side of the wiring block comprises a delta configuration, a Y configuration or a parallel configuration.

23 Claims, 12 Drawing Sheets

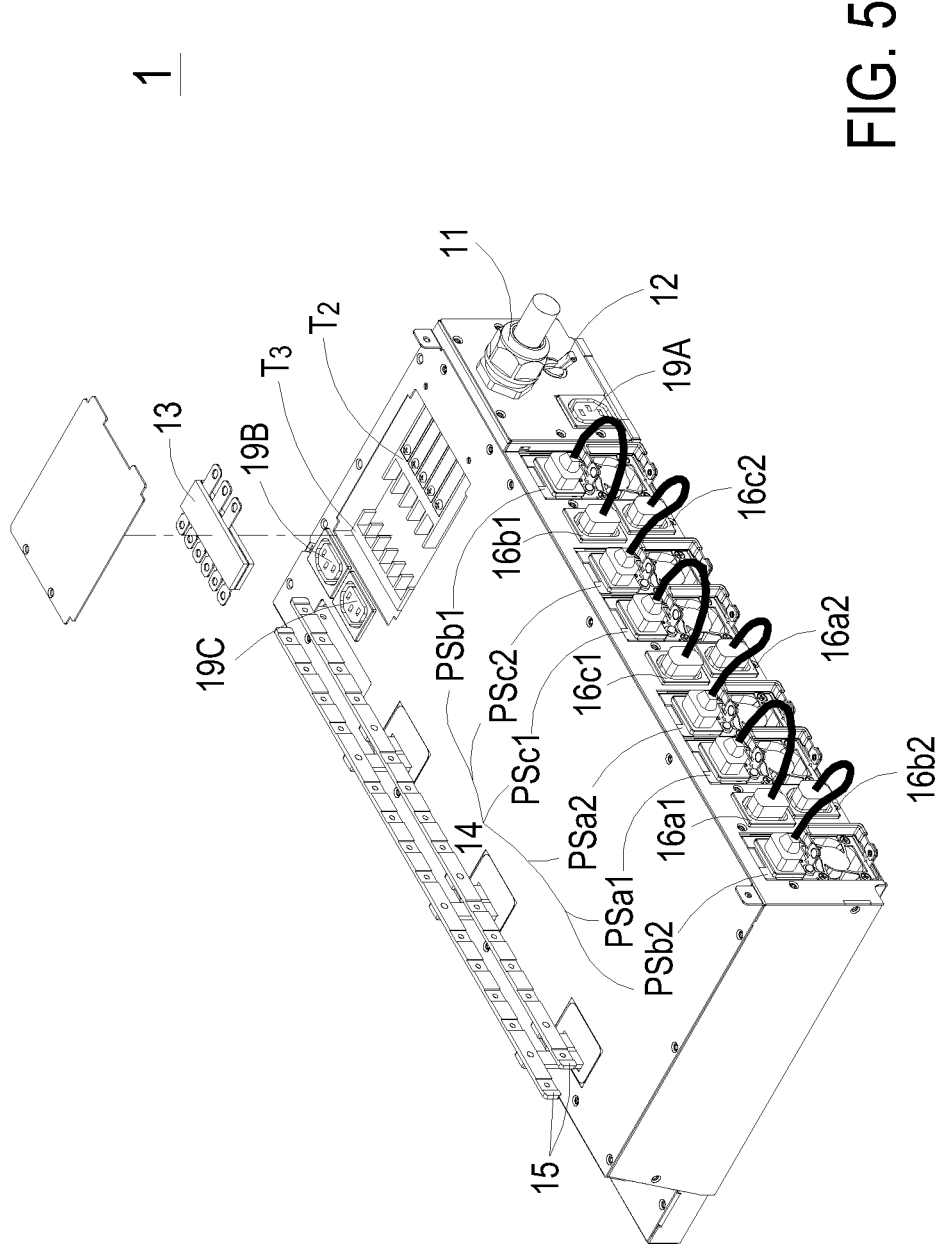

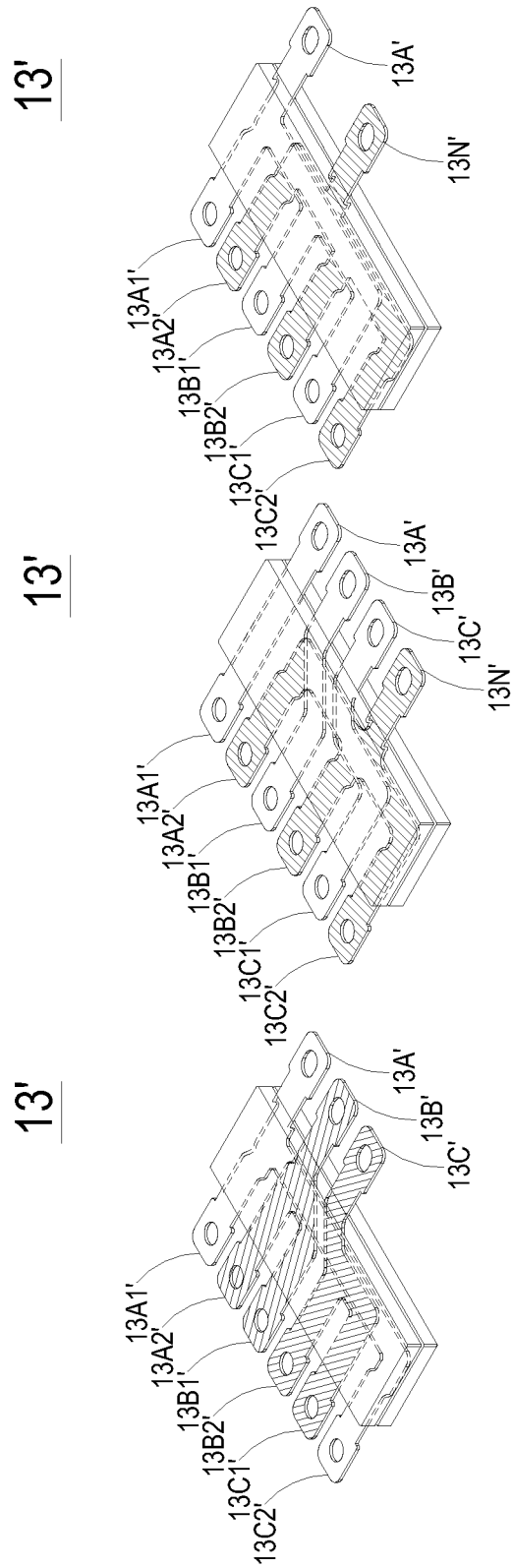

US 8,659,881 B2

POWER DISTRIBUTION UNIT FOR RECEIVING DIVERSIFIED THREE-PHASE POWER OR SINGLE-PHASE POWER

FIELD OF THE INVENTION

The present invention relates to a power distribution unit, and more particularly to a power distribution unit used in a data center for receiving diversified three-phase power or single-phase power.

BACKGROUND OF THE INVENTION

With increasing development of personal computers and networks, the services provided through networks are becoming more and more appealing in various applications. A data center is a facility used to house computers or servers. For providing intensive network applications, the numbers of computers or servers need to be increased. Under this circumstance, the mechanism of distributing electric power in the data center becomes an important issue.

Generally, a power distribution unit (PDU) is used to distribute electric power among the computers or servers of the data center. For designing a power distribution unit, the kind of utility power to be provided to the power distribution unit and the location of the power distribution unit should be determined in advance. According to the kind of utility power and the location of the power distribution unit, an exclusive power distribution unit is assembled. Therefore, the power distribution unit fails to be used in another data center with different specifications.

Due to globalization, international corporations usually build many data centers in different countries or regions in order to increase the efficiency of the data centers. As known, the utility power specifications (e.g. 120/400 volt, 3-phase, 4-wire or 220 volt, 1-phase, 2-wire) for different countries or regions may be distinguished. For complying with the utility power specifications, the data centers in different countries or regions have respective exclusive power distribution units. In a case that a power distribution unit has a breakdown, the maintenance worker may replace the power distribution unit with a new one that complies with the desired utility power specification. As, the cost and difficulty associated with maintenance are increased.

For increasing the overall operating efficiency of the data center, the location of the data center may be changed. Since the utility power specification at the new location is changed, the power distribution unit of the data center fails to be used. It is necessary to purchase or design a new power distribution unit to comply with the new utility power specification, which increases the cost and wastes resource.

For solving the above drawbacks, the manufactures usually produce many kinds of power distribution units in order to comply with different utility power specifications. Since different power distribution units have different component specification, the complexity of assembling the power distribution units and the fabricating cost are both increased.

Therefore, there is a need of providing a power distribution unit so as to obviate the drawbacks encountered in the prior art.

SUMMARY OF THE INVENTION

An object of the present invention provides a power distribution unit used in a data center for receiving diversified three-phase power or single-phase power, in which the power distribution unit could be used in different countries or regions with different utility power specifications in order to reduce the fabricating complexity and cost.

Another object of the present invention provides a power distribution unit used in a data center for receiving diversified three-phase power or single-phase power, in which few components need to be changed to comply with different utility power specifications in order to reduce the assembling complexity and cost.

In accordance with an aspect of the present invention, there is provided a power distribution unit for receiving diversified three-phase power or single-phase power. The power distribution unit includes a separable power cord and a separable wiring block. The separable power cord is used for receiving electric energy of input power. The separable wiring block is electrically connected with the power cord for providing at least one connection configuration. The connection configuration provided by one side of the wiring block comprises a delta configuration, a Y configuration or a parallel configuration.

In accordance with another aspect of the present invention, there is provided a power distribution unit for receiving diversified three-phase power or single-phase power. The power distribution unit includes a separable power cord, first, second and third power output assemblies, and a separable wiring block. The separable power cord is used for receiving electric energy of input power. The first, second and third power output assemblies are used for converting the input power into output power. The separable wiring block is electrically interconnected between the power cord and the three power output assemblies. The power cord is selected according to the input power and/or the output power. The first, second and third power output assemblies are connected in a delta configuration or a Y configuration or connected with each other in parallel according to the wiring block.

The above contents of the present invention will become more readily apparent to those ordinarily skilled in the art after reviewing the following detailed description and accompanying drawings, in which:

BRIEF DESCRIPTION OF THE DRAWINGS

FIG. 5 is a schematic perspective view illustrating a power distribution unit for receiving diversified three-phase power or single-phase power according to an embodiment of the present invention;

FIG. 14 is a schematic perspective view illustrating an exemplary first-type wiring block used in the power distribution unit of FIG. 9 or FIG. 12;

FIG. 15 is a schematic perspective view illustrating an exemplary second-type wiring block used in the power distribution unit of FIG. 10; and FIG. 16 is a schematic perspective view illustrating an exemplary third-type wiring block used in the power distribution unit of FIG. 11.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
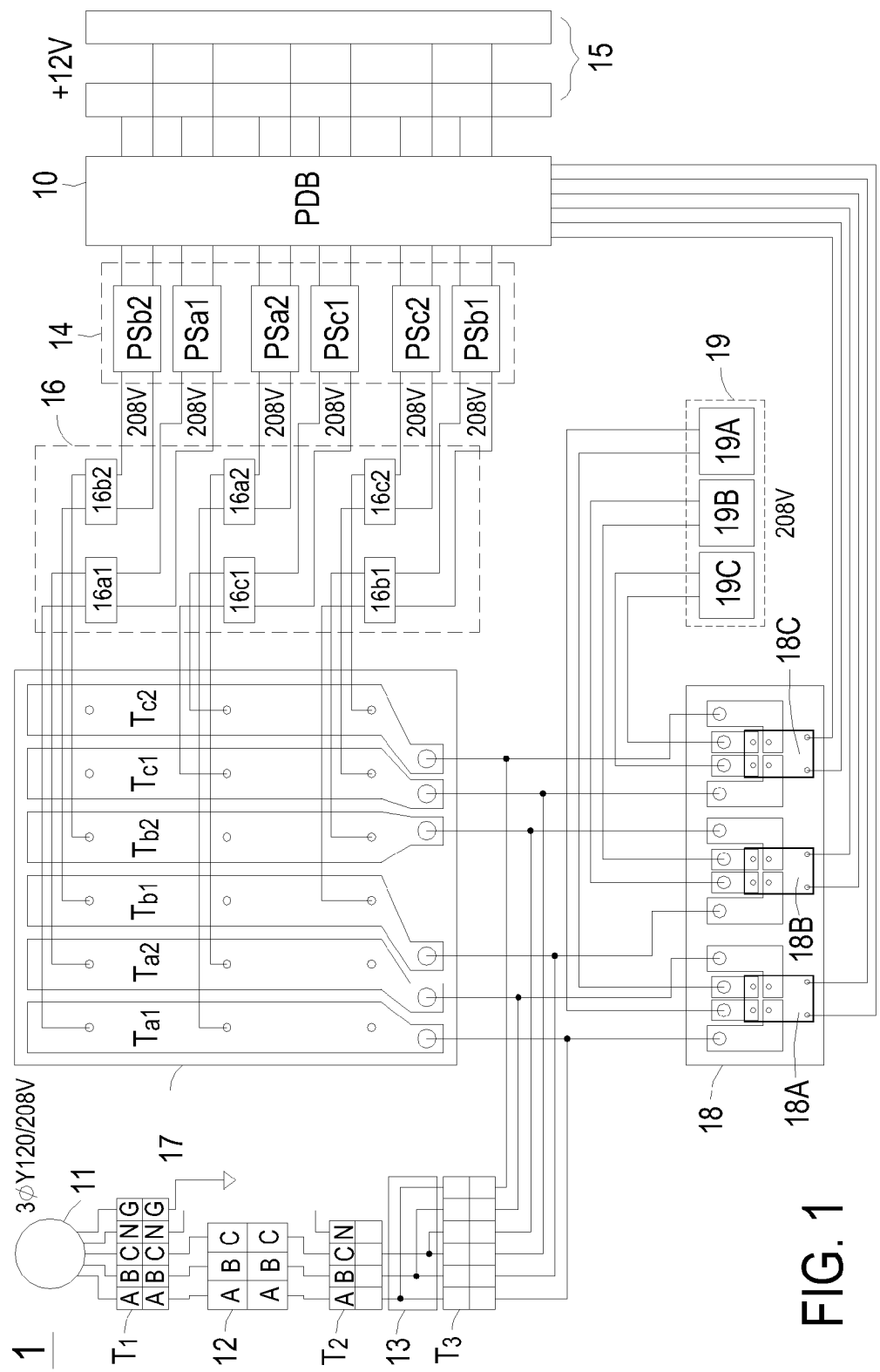
FIG. 1 is a schematic circuit diagram illustrating a power distribution unit for receiving diversified three-phase power or single-phase power according to a first embodiment of the present invention.

FIG. 1 is a schematic circuit diagram illustrating a power distribution unit for receiving diversified three-phase power or single-phase power according to a first embodiment of the present invention. As shown in FIG. 1, the power distribution unit (PDU) 1 comprises a separable power cord 11, a breaker 12, a separable wiring block 13, three power output assemblies 14, a bus bar 15, three power receptacle assemblies 16, a first input power delivering PCB (printed circuit board) 17, a second input power delivering PCB 18, three accessory power receptacles 19, a power distribution board (PDB) 10, a first fixed terminal block T1, a second fixed terminal block T2, and a third fixed terminal block T3.

The power distribution unit 1 is electrically connected to a utility power supply source (not shown) through the power cord 11, so that the input power (utility power) provided by the utility power supply source could be transmitted to the power distribution unit 1. The input wires of the power cord 11 are respectively connected to a first terminal A, a second terminal B, a third terminal C, a neutral terminal N and an equipment ground terminal G of the first fixed terminal block T1. The second fixed terminal block T2 comprises a first terminal A, a second terminal B, a third terminal C, and a neutral terminal N. The first terminal A, the second terminal B and the third terminal C of the first fixed terminal block T1 are respectively connected with the first terminal A, the second terminal B and the third terminal C of the second fixed terminal block T2 through the breaker 12. The neutral terminal N of the first fixed terminal block T1 and the neutral terminal N of the second fixed terminal block T2 are directly connected with each other. The equipment ground terminal G of the first fixed terminal block T1 is electrically connected to a housing (not shown) of the power distribution unit 1.

The wiring block 13 is interconnected between the second fixed terminal block T2 and the third fixed terminal block T3 for determining the values of voltage transmitted to the input ends of the power output assemblies 14 and the accessory power receptacles 19. In this embodiment, the input ends of the power output assemblies 14 are connected to the wiring block 13 through the power receptacles 16, the first input power delivering PCB 17 and the third fixed terminal block T3.

In this embodiment, the three power output assemblies 14 comprise three sets of power supply apparatuses, which comprise a first power supply apparatus PSa1, a second power supply apparatus PSb1, a third power supply apparatus PSc1, a fourth power supply apparatus PSa2, a fifth power supply apparatus PSb2, and a sixth power supply apparatus PSc2. The first power output assembly (i.e. a first power supply assembly) comprises the first power supply apparatus PSa1 and the fourth power supply apparatus PSa2. The second power output assembly (i.e. a second power supply assembly) comprises the second power supply apparatus PSb1 and the fifth power supply apparatus PSb2. The third power output assembly (i.e. a third power supply assembly) comprises the third power supply apparatus PSc1 and the sixth power supply apparatus PSc2.

The three power receptacle assemblies 16 comprise a first power receptacle 16a1, a second power receptacle 16b1, a third power receptacle 16c1, a fourth power receptacle 16a2, a fifth power receptacle 16b2, and a sixth power receptacle 16c2. The first power receptacle assembly comprises the first power receptacle 16a1 and the fourth power receptacle 16a2. The second power receptacle assembly comprises the second power receptacle 16b1 and the fifth power receptacle 16b2. The third power receptacle assembly comprises the third power receptacle 16c1 and the sixth power receptacle 16c2.

In this embodiment, the first input power delivering PCB 17 comprises a first conducting trace Ta1, a second conducting trace Tb1, a third conducting trace Tc1, a fourth conducting trace Ta2, a fifth conducting trace Tb2, and a sixth conducting trace Tc2, which are respectively connected to six contacts of the third fixed terminal block T3. In the first power output assembly, the input ends of the first power supply apparatus PSa1 and the input ends of the fourth power supply apparatus PSa2 are connected with each other in parallel. Through the first power receptacle 16a1 and the fourth power receptacle 16a2 of the first power receptacle assembly, the input ends of the first power supply apparatus PSa1 and the input ends of the fourth power supply apparatus PSa2 are connected with the first conducting trace Ta1 and the fourth conducting trace Ta2. In the second power output assembly, the input ends of the second power supply apparatus PSb1 and the input ends of the fifth power supply apparatus PSb2 are connected with each other in parallel. Through the second power receptacle 16b1 and the fifth power receptacle 16b2 of the second power receptacle assembly, the input ends of the second power supply apparatus PSb1 and the input ends of the fifth power supply apparatus PSb2 are connected with the second conducting trace Tb1 and the fifth conducting trace Tb2. In the third power output assembly, the input ends of the third power supply apparatus PSc1 and the input ends of the sixth power supply apparatus PSc2 are connected with each other in parallel. Through the third power receptacle 16c1 and the sixth power receptacle 16c2 of the third power receptacle assembly, the input ends of the third power supply apparatus PSc1 and the input ends of the sixth power supply apparatus PSc2 are connected with the third conducting trace Tc1 and the sixth conducting trace Tc2.

In this embodiment, the output power is a single voltage value of 12 volts. The output ends of the first power supply apparatus PSa1, the second power supply apparatus PSb1, the third power supply apparatus PSc1, the fourth power supply apparatus PSa2, the fifth power supply apparatus PSb2 and the sixth power supply apparatus PSc2 are connected to the bus bar 15 in parallel through the power distribution board (PDB) 10. As such, the 12-volt voltage is transmitted to the bus bar 15 to be employed by the computers or servers of a data center (not shown). The power distribution board 10 is further connected with the control ends of a first switch element 18A, a second switch element 18B and a third switch element 18C, and the computers or servers of the data center (not shown). The computers or servers of the data center could issue control signals to the first switch element 18A, the second switch element 18B and the third switch element 18C through the power distribution board 10. According to the control signals, the first switch element 18A, the second switch element 18B and the third switch element 18C are selectively conducted or shut off.

The three accessory power receptacles 19 are connected with the third fixed terminal block T3 through the second input power delivering PCB 18, so that the electric energy of the input power could be transmitted to the three accessory power receptacles 19. The first switch element 18A, the second switch element 18B and the third switch element 18C are mounted on the second input power delivering PCB 18. In addition, the first switch element 18A, the second switch element 18B and the third switch element 18C are selectively conducted or shut off under control of the computers or servers of the data center. In a case that the first switch element 18A, the second switch element 18B and the third switch element 18C are conducted, the electric energy of the input power could be transmitted to the three accessory power receptacles 19 through the second input power delivering PCB 18. Examples of the first switch element 18A, the second switch element 18B and the third switch element 18C include but are not limited to relays or transistors.

In this embodiment, the input power is 120/208 volt (3-phase, 4-pole, 5-wire) in a Y-connection configuration. Correspondingly, the power cord 11 has five wires. The five input wires of the power cord 11 are respectively connected to the first terminal A, the second terminal B, the third terminal C, the neutral terminal N and the equipment ground terminal G of the first fixed terminal block T1. That is, the voltage difference between any two of the first terminal A, the second terminal B and the third terminal C for the first fixed terminal block T1 and the second fixed terminal block T2 is 208 volt.

In this embodiment, the wiring block 13 is a first-type wiring block. By means of the first-type wiring block 13, the input ends of the three power output assemblies 14 are connected in a delta (or Δ) configuration. As such, the voltage difference between the first conducting trace Ta1 and the fourth conducting trace Ta2 is equal to the voltage difference between the first terminal A and the second terminal B of the second fixed terminal block T2. That is, a first wiring voltage $V_{AB}$ is equal to 208 volt. Similarly, the voltage difference between the second conducting trace Tb1 and the fifth conducting trace Tb2 is equal to the voltage difference between the second terminal B and the third terminal C of the second fixed terminal block T2. That is, a second wiring voltage $V_{BC}$ is equal to 208 volt. Similarly, the voltage difference between the third conducting trace Tc1 and the sixth conducting trace Tc2 is equal to the voltage difference between the third terminal C and the first terminal A of the second fixed terminal block T2. That is, a third wiring voltage $V_{CA}$ is equal to 208 volt. The voltages transmitted to the input ends of the first, second and third power output assemblies are equal to the first wiring voltage $V_{AB}$ (=208 volt), the second wiring voltage $V_{BC}$ (=208 volt) and the third wiring voltage $V_{CA}$ (=208 volt) of the input power, respectively. Likewise, the voltages transmitted to the first accessory power receptacle 19A, the second accessory power receptacle 19B and the third accessory power receptacle 19C are equal to the first wiring voltage $V_{AB}$, the second wiring voltage $V_{BC}$ and the third wiring voltage $V_{CA}$ of the input power, respectively.

Figure 2:
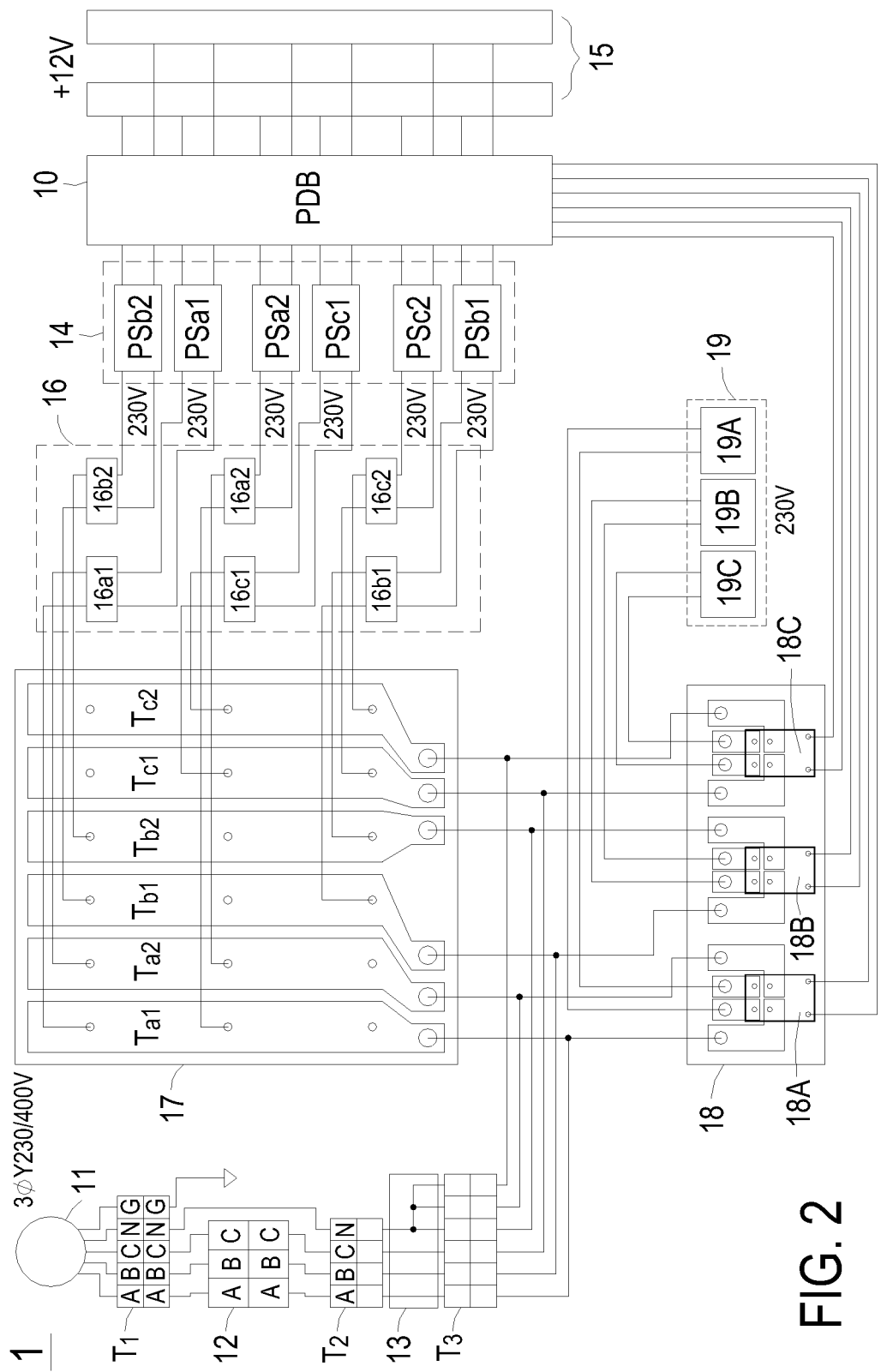
FIG. 2 is a schematic circuit diagram illustrating a power distribution unit for receiving diversified three-phase power or single-phase power according to a second embodiment of the present invention.

FIG. 2 is a schematic circuit diagram illustrating a power distribution unit for receiving diversified three-phase power or single-phase power according to a second embodiment of the present invention. In this embodiment, the input power is 230/400 volt (3-phase, 4-pole, 5-wire) in a Y-connection configuration. In this embodiment, the wiring block 13 is a second-type wiring block. By means of the second-type wiring block 13, the input ends of the three power output assemblies 14 are connected in a Y configuration. As such, the voltage difference between the first conducting trace Ta1 and the fourth conducting trace Ta2 is equal to the voltage difference between the first terminal A and the neutral terminal N of the second fixed terminal block T2. That is, a first phase voltage $V_{AN}$ is equal to 230 volt. Similarly, the voltage difference between the second conducting trace Tb1 and the fifth conducting trace Tb2 is equal to the voltage difference between the second terminal B and the neutral terminal N of the second fixed terminal block T2. That is, a second phase voltage $V_{BN}$ is equal to 230 volt. Similarly, the voltage difference between the third conducting trace Tc1 and the sixth conducting trace Tc2 is equal to the voltage difference between the third terminal C and the neutral terminal N of the second fixed terminal block T2. That is, a third phase voltage $V_{CN}$ is equal to 230 volt.

The voltage difference between any two of the first terminal A, the second terminal B and the third terminal C for the first fixed terminal block T1 and the second fixed terminal block T2 is 400 volt. However, voltages transmitted to the input ends of the first, second and third power output assemblies are equal to the first phase voltage $V_{AN}$ (=230 volt), the second phase voltage $V_{BN}$ (=230 volt) and the third phase voltage $V_{CN}$ (=230 volt), respectively. Likewise, the voltages transmitted to the first accessory power receptacle 19A, the second accessory power receptacle 19B and the third accessory power receptacle 19C are equal to the first phase voltage $V_{AN}$, the second phase voltage $V_{BN}$ and the third phase voltage $V_{CN}$ of the input power, respectively.

Figure 3:
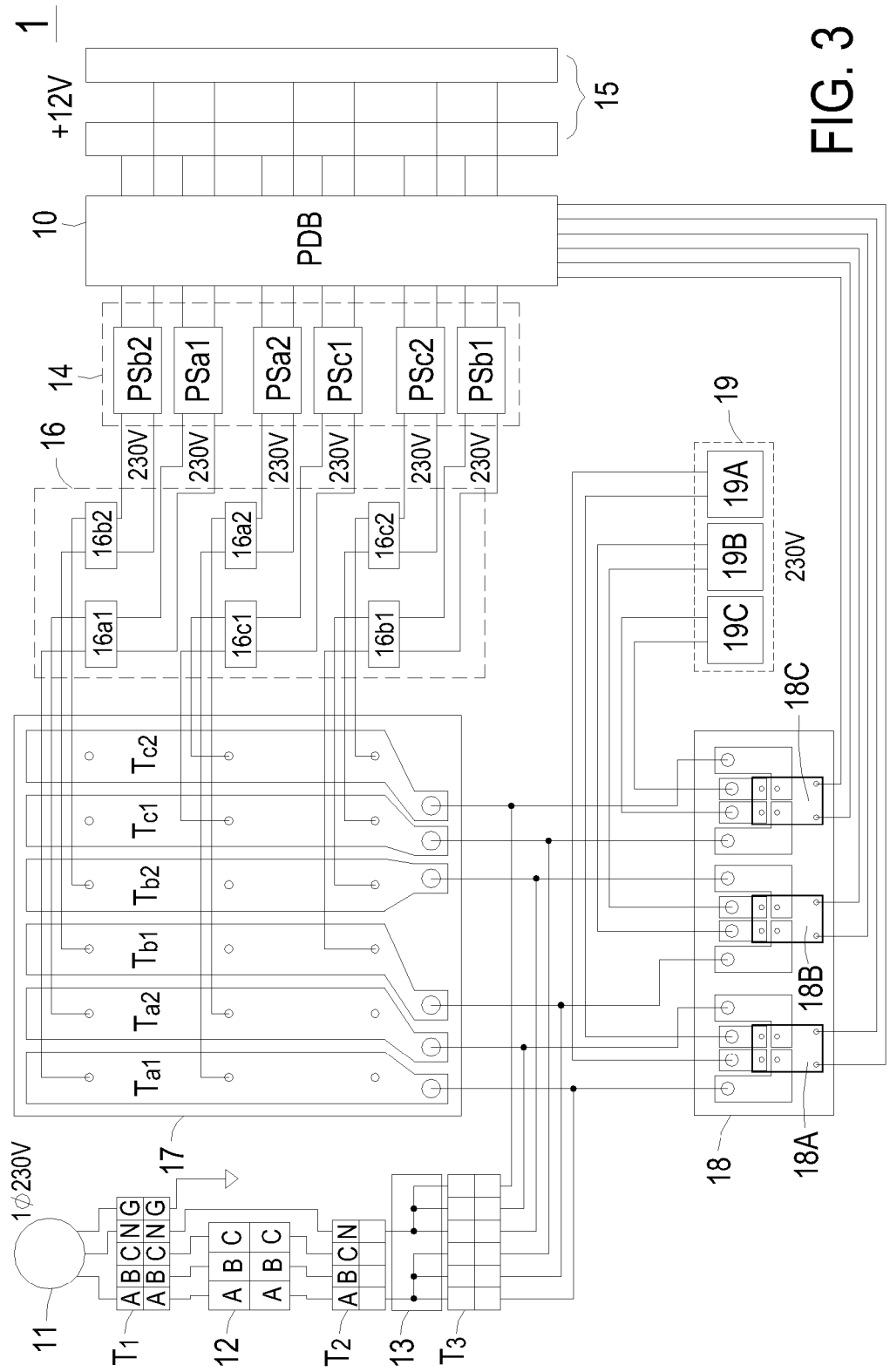
FIG. 3 is a schematic circuit diagram illustrating a power distribution unit for receiving diversified three-phase power or single-phase power according to a third embodiment of the present invention.

FIG. 3 is a schematic circuit diagram illustrating a power distribution unit for receiving diversified three-phase power or single-phase power according to a third embodiment of the present invention. In this embodiment, the input power is 230 volt (1-phase, 2-pole, 3-wire). Correspondingly, the power cord 11 has three wires. The three input wires of the power cord 11 are respectively connected to the first terminal A, the neutral terminal N and the equipment ground terminal G of the first fixed terminal block T1. In this embodiment, the wiring block 13 is a third-type wiring block. By means of the third-type wiring block 13, the input ends of the three power output assemblies 14 are connected with each other in parallel. Each of the voltage difference between the first conducting trace Ta1 and the fourth conducting trace Ta2, the voltage difference between the second conducting trace Tb1 and the fifth conducting trace Tb2 and the voltage difference between the third conducting trace Tc1 and the sixth conducting trace Tc2 is equal to the voltage difference between the first terminal A and the neutral terminal N of the second fixed terminal block T2. That is, a wiring voltage $V_{CA}$ is equal to 230 volt.

Figure 4:
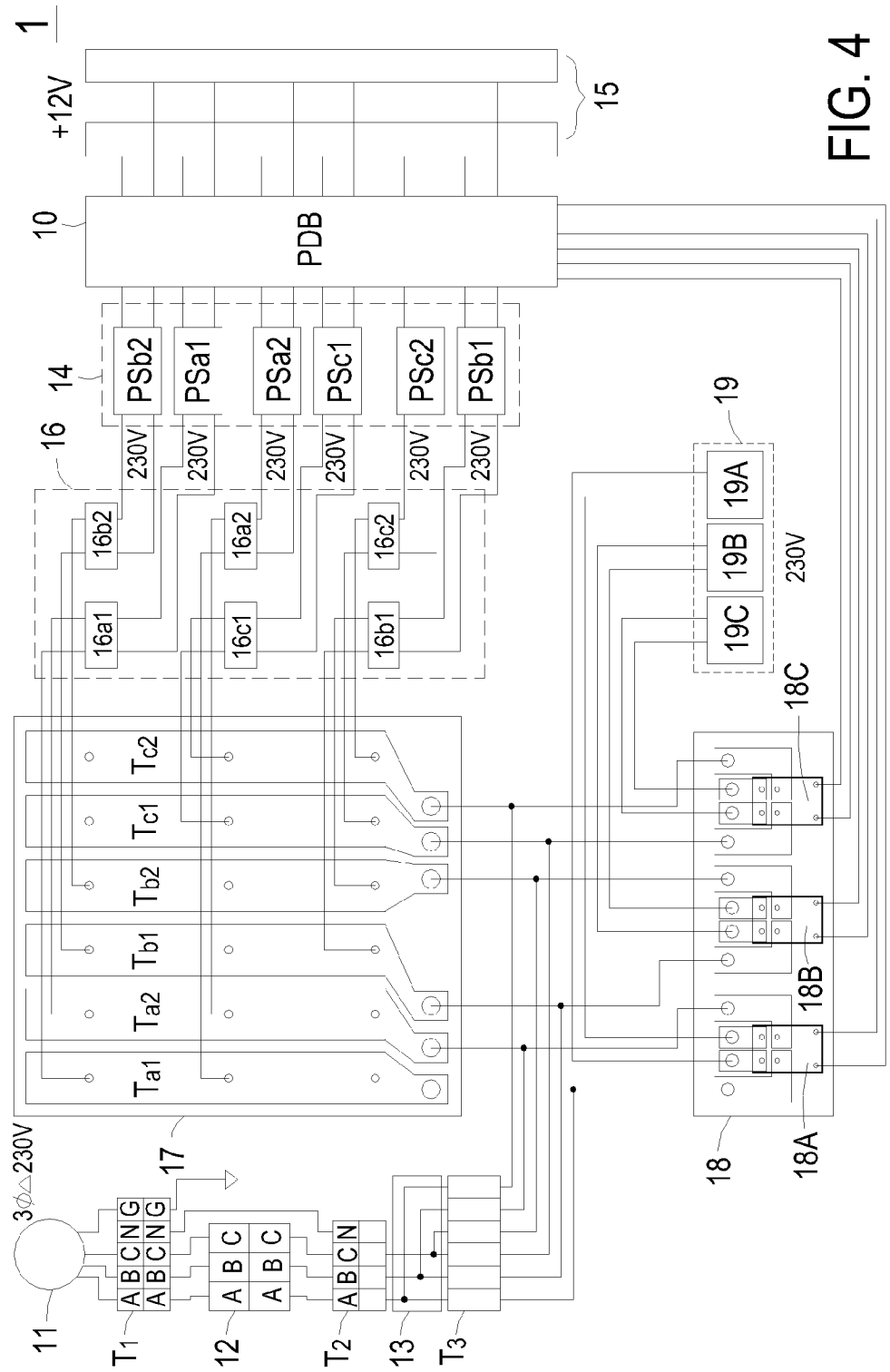
FIG. 4 is a schematic circuit diagram illustrating a power distribution unit for receiving diversified three-phase power or single-phase power according to a fourth embodiment of the present invention.

FIG. 4 is a schematic circuit diagram illustrating a power distribution unit for receiving diversified three-phase power or single-phase power according to a fourth embodiment of the present invention. In this embodiment, the input power is 230 volt (3-phase, 3-pole, 4-wire) in a delta-connection configuration. Correspondingly, the power cord 11 has four wires. The four input wires of the power cord 11 are respectively connected to the first terminal A, the second terminal B, the third terminal C and the equipment ground terminal G of the first fixed terminal block T1. That is, the voltage difference between any two of the first terminal A, the second terminal B and the third terminal C for the first fixed terminal block T1 and the second fixed terminal block T2 is 230 volt.

In this embodiment, the wiring block 13 is also the first-type wiring block. By means of the first-type wiring block 13, the input ends of the three power output assemblies 14 are connected in a delta (or Δ) configuration. As such, the voltage difference between the first conducting trace Ta1 and the fourth conducting trace Ta2 is equal to the voltage difference between the first terminal A and the second terminal B of the second fixed terminal block T2. That is, a first wiring voltage $V_{AB}$ is equal to 230 volt. Similarly, the voltage difference between the second conducting trace Tb1 and the fifth conducting trace Tb2 is equal to the voltage difference between the second terminal B and the third terminal C of the second fixed terminal block T2. That is, a second wiring voltage $V_{BC}$ is equal to 230 volt. Similarly, the voltage difference between the third conducting trace Tc1 and the sixth conducting trace Tc2 is equal to the voltage difference between the third terminal C and the first terminal A of the second fixed terminal block T2. That is, a third wiring voltage $V_{CA}$ is equal to 230 volt. The voltages transmitted to the input ends of the first, second and third power output assemblies are equal to the first wiring voltage $V_{AB}$ (=230 volt), the second wiring voltage $V_{BC}$ (=230 volt) and the third wiring voltage $V_{CA}$ (=230 volt) of the input power, respectively. Likewise, the voltages transmitted to the first accessory power receptacle 19A, the second accessory power receptacle 19B and the third accessory power receptacle 19C are equal to the first wiring voltage $V_{AB}$, the second wiring voltage $V_{BC}$ and the third wiring voltage $V_{CA}$ of the input power, respectively.

FIG. 5 is a schematic perspective view illustrating a power distribution unit for receiving diversified three-phase power or single-phase power according to an embodiment of the present invention. Please refer to FIGS. 1~5. The power distribution unit 1 is electrically connected to a utility power supply source (not shown) through the power cord 11, so that the input power (utility power) provided by the utility power supply source could be transmitted to the power distribution unit 1. The input power is then transmitted to the six power supply apparatuses of the three power output assemblies 14 through the breaker 12 and the wiring block 13. The electric energy of the input power is received by the power output assemblies 14 and converted into output power.

By manually turning on or turning off the breaker 12, the power distribution unit 1 is selectively enabled or disabled. If the power distribution unit 1 is in an over-current condition, the breaker 12 will be automatically open to interrupt the circuit in order to protect the power distribution unit 1.

For complying with a variety of utility power specifications, the power cord 11 and the wiring block 13 of the power distribution unit 1 are separable. By means of a fastening element (e.g. a screw), the power cord 11 is fixed onto the first fixed terminal block T1 (not shown). Alternatively, the wiring block 13 could be fixed between the second fixed terminal block T2 and the third fixed terminal block T3. By replacing the power cord 11 and a corresponding wiring block 13, the power distribution unit 1 could receive the utility power according to a variety of utility power specifications. In some embodiments, the power cord 11 and the wiring block 13 may have engaging elements for facilitating assembling the power cord 11 and the wiring block 13.

Moreover, the input ends of the power supply apparatuses are connected with respective power receptacles through respective power wires, so that the input ends of the three power output assemblies 14 are connected with the wiring block 13. By selecting a proper type of wiring block 13, the input ends of the three power output assemblies 14 are connected in a delta configuration or a Y configuration, or connected with each other in parallel. As a consequence, the voltages transmitted to the input ends of the three power output assemblies 14 are within the acceptable ranges of the three power output assemblies 14.

Figures 6, 7, 8:
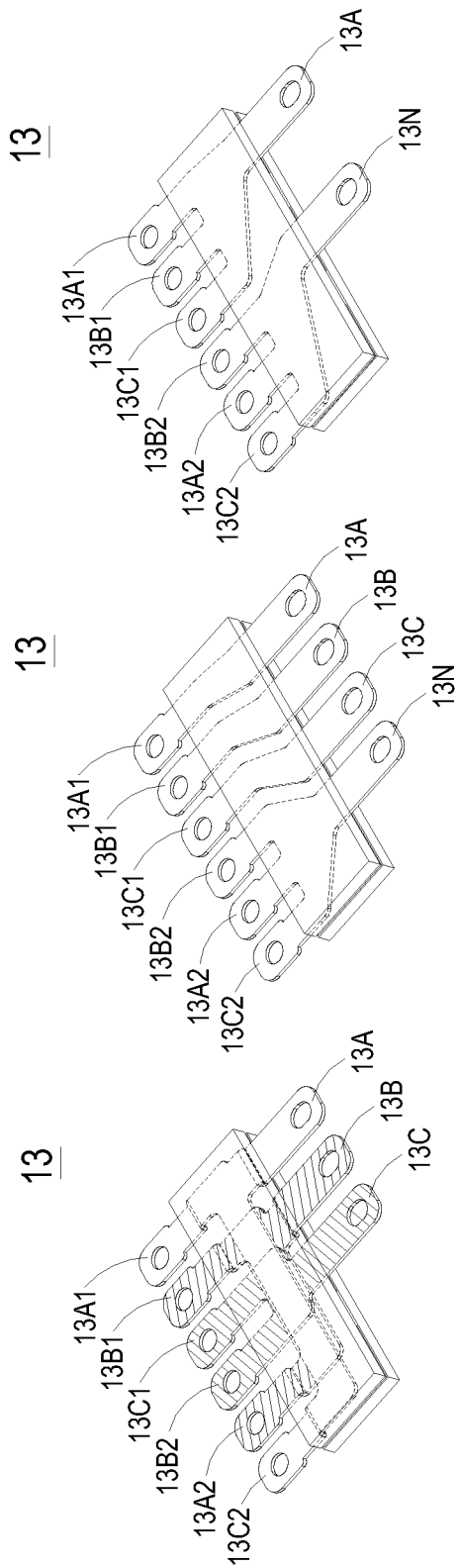
FIG. 6 is a schematic perspective view illustrating an exemplary first-type wiring block used in the power distribution unit of FIG. 1 or FIG. 4.
FIG. 7 is a schematic perspective view illustrating an exemplary second-type wiring block used in the power distribution unit of FIG. 2.
FIG. 8 is a schematic perspective view illustrating an exemplary third-type wiring block used in the power distribution unit of FIG. 3.

FIG. 6 is a schematic perspective view illustrating an exemplary first-type wiring block used in the power distribution unit of FIG. 1 or FIG. 4. As shown in FIG. 6, the first-type wiring block 13 comprises a first-side first pin 13A, a first-side second pin 13B, a first-side third pin 13C, a second-side first pin 13A1, a second-side second pin 13B1, a second-side third pin 13C1, a second-side fourth pin 13B2, a second-side fifth pin 13A2, and a second-side sixth pin 13C2. The first-side first pin 13A, the second-side first pin 13A1 and the second-side sixth pin 13C2 are coupled with each other. The first-side second pin 13B, the second-side second pin 13B1 and the second-side fifth pin 13A2 are coupled with each other. The first-side third pin 13C, the second-side third pin 13C1 and the second-side fourth pin 13B2 are coupled with each other. After the first side and the second side of the first-type wiring block 13 are respectively fixed and coupled to the second fixed terminal block T2 and the third fixed terminal block T3, the input ends of the three power output assemblies 14 are connected in a delta configuration.

FIG. 7 is a schematic perspective view illustrating an exemplary second-type wiring block used in the power distribution unit of FIG. 2. As shown in FIG. 7, the second-type wiring block 13 comprises a first-side first pin 13A, a first-side second pin 13B, a first-side third pin 13C, a first-side neutral pin 13N, a second-side first pin 13A1, a second-side second pin 13B1, a second-side third pin 13C1, a second-side fourth pin 13B2, a second-side fifth pin 13A2, and a second-side sixth pin 13C2. The first-side first pin 13A is coupled with the second-side first pin 13A1. The first-side second pin 13B is coupled with the second-side second pin 13B1. The first-side third pin 13C is coupled with the second-side third pin 13C1. The first-side neutral pin 13N is coupled with the second-side fourth pin 13B2, the second-side fifth pin 13A2 and the second-side sixth pin 13C2. After the first side and the second side of the first-type wiring block 13 are respectively fixed and coupled to the second fixed terminal block T2 and the third fixed terminal block T3, the input ends of the three power output assemblies 14 are connected in a Y configuration.

FIG. 8 is a schematic perspective view illustrating an exemplary third-type wiring block used in the power distribution unit of FIG. 3. As shown in FIG. 8, the third-type wiring block 13 comprises a first-side first pin 13A, a first-side neutral pin 13N, a second-side first pin 13A1, a second-side second pin 13B1, a second-side third pin 13C1, a second-side fourth pin 13B2, a second-side fifth pin 13A2, and a second-side sixth pin 13C2. The first-side first pin 13A is coupled with the second-side first pin 13A1, the second-side second pin 13B1 and the second-side third pin 13C1. The first-side neutral pin 13N is coupled with the second-side fourth pin 13B2, the second-side fifth pin 13A2 and the second-side sixth pin 13C2. After the first side and the second side of the first-type wiring block 13 are respectively fixed and coupled to the second fixed terminal block T2 and the third fixed terminal block T3, the input ends of the three power output assemblies 14 are connected with each other in parallel.

Figure 9:
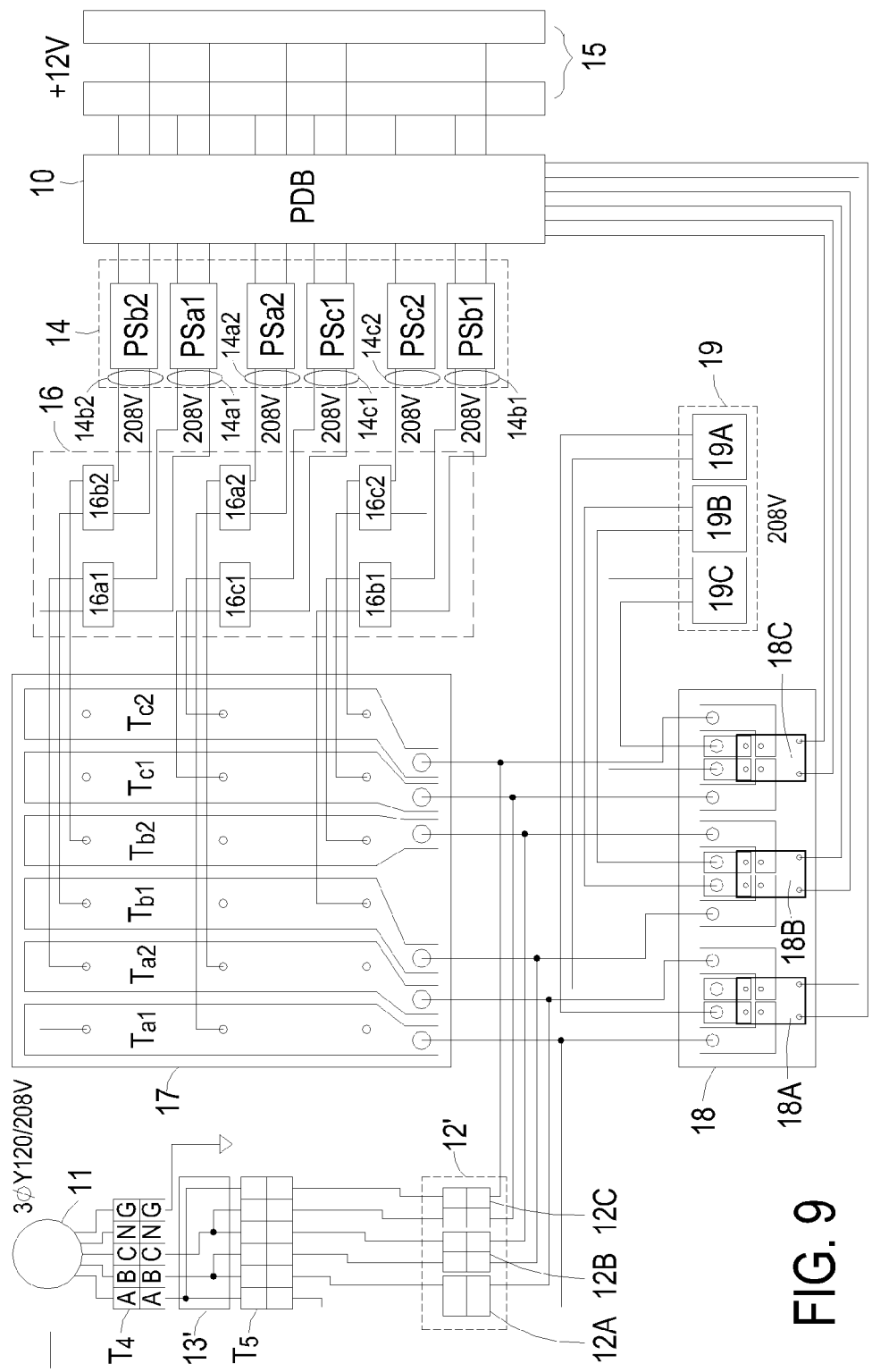
FIG. 9 is a schematic circuit diagram illustrating a power distribution unit for receiving diversified three-phase power or single-phase power according to another first embodiment of the present invention.

FIG. 9 is a schematic circuit diagram illustrating a power distribution unit for receiving diversified three-phase power or single-phase power according to another first embodiment of the present invention. As shown in FIG. 9, the power distribution unit (PDU) 1 comprises a separable power cord 11, a separable wiring block 13', a breaker unit 12', three power output assemblies 14, a bus bar 15, three power receptacle assemblies 16, a first input power delivering PCB (printed circuit board) 17, a second input power delivering PCB 18, three accessory power receptacles 19, a power distribution board (PDB) 10, a fourth fixed terminal block T4, and a fifth fixed terminal block T5. The configurations and the operation principles of the power output assemblies 14, the bus bar 15, the power receptacle assemblies 16, the first input power delivering PCB (printed circuit board) 17, the second input power delivering PCB 18, the accessory power receptacles 19, the power distribution board (PDB) 10 of the power distribution unit (PDU) 1 of FIG. 9 are similar to those shown in FIG. 1, and are not redundantly described herein. In comparison with the power distribution unit (PDU) 1 of FIG. 1, the second fixed terminal block T2 is omitted and the connection relationships and operations of the fourth fixed terminal block T4, the separable wiring block 13', the fifth fixed terminal block T5 and the breaker unit 12' of the PDU 1 of FIG. 9 are different from that of the first fixed terminal block T1, the breaker 12, the second fixed terminal block T2, the separable wiring block 13 and the third fixed terminal block T3 of the PDU 1 of FIG. 1.

The power distribution unit 1 of FIG. 9 is electrically connected to a utility power supply source (not shown) through the power cord 11, so that the input power (utility power) provided by the utility power supply source could be transmitted to the power distribution unit 1. In this embodiment, the input power is 120/208 volt (3-phase, 4-pole, 5-wire) in a Y-connection configuration. Correspondingly, the power cord 11 has five wires. The five input wires of the power cord 11 are respectively connected to the first terminal A, the second terminal B, the third terminal C, the neutral terminal N and the equipment ground terminal G of the fourth fixed terminal block T4. The wiring block 13' is interconnected between the fourth fixed terminal block T4 and the fifth fixed terminal block T5 for determining the values of voltage transmitted to the input ends of the power output assemblies 14 and the accessory power receptacles 19. In this embodiment, the input ends of the power output assemblies 14 are connected to the wiring block 13' through the power receptacles 16, the first input power delivering PCB 17 and the fifth fixed terminal block T5.

The breaker unit 12' comprises three single-switching 2-pole breakers 12A~12C for protecting the components in respective circuit loop. The first breaker 12A is connected between the first terminal and the second terminal of the fifth fixed terminal block T5 and the first conducting trace Ta1 and the fourth conducting trace Ta2 of the first input power delivering PCB 17 for protecting the components in the first circuit loop, such as the first conducting trace Ta1, the fourth conducting trace Ta2, the first power receptacle 16a1, the fourth power receptacle 16a2, the first power cord 14a1 and the fourth power cord 14a2. Similarly, the second breaker 12B is connected between the third terminal and the fourth terminal of the fifth fixed terminal block T5 and the second conducting trace Tb1 and the fifth conducting trace Tb2 of the first input power delivering PCB 17 for protecting the components in the second circuit loop, such as the second conducting trace Tb1, the fifth conducting trace Tb2, the second power receptacle 16b1, the fifth power receptacle 16b2, the second power cord 14b1 and the fifth power cord 14b2. The third breaker 12C is connected between the fifth terminal and the six terminal of the fifth fixed terminal block T5 and the third conducting trace Tc1 and the sixth conducting trace Tc2 of the first input power delivering PCB 17 for protecting the components in the third circuit loop, such as the third conducting trace Tc1, the sixth conducting trace Tc2, the third power receptacle 16c1, the sixth power receptacle 16c2, the third power cord 14c1 and the sixth power cord 14c2.

In this embodiment, the wiring block 13' is a first-type wiring block. By means of the first-type wiring block 13', the input ends of the three power output assemblies 14 are connected in a delta (or ∆) configuration. As such, the voltage difference between the first conducting trace Ta1 and the fourth conducting trace Ta2 is equal to the voltage difference between the first terminal A and the second terminal B of the fourth fixed terminal block T4. That is, a first wiring voltage $V_{AB}$ is equal to 208 volt. Similarly, the voltage difference between the second conducting trace Tb1 and the fifth conducting trace Tb2 is equal to the voltage difference between the second terminal B and the third terminal C of the fourth fixed terminal block T4. That is, a second wiring voltage $V_{BC}$ is equal to 208 volt. Similarly, the voltage difference between the third conducting trace Tc1 and the sixth conducting trace Tc2 is equal to the voltage difference between the third terminal C and the first terminal A of the fourth fixed terminal block T4. That is, a third wiring voltage $V_{CA}$ is equal to 208 volt. The voltages transmitted to the input ends of the first, second and third power output assemblies are equal to the first wiring voltage $V_{AB}$ (=208 volt), the second wiring voltage $V_{BC}$ (=208 volt) and the third wiring voltage $V_{CA}$ (=208 volt) of the input power, respectively. Likewise, the voltages transmitted to the first accessory power receptacle 19A, the second accessory power receptacle 19B and the third accessory power receptacle 19C are equal to the first wiring voltage $V_{AB}$, the second wiring voltage $V_{BC}$ and the third wiring voltage $V_{CA}$ of the input power, respectively.

Figure 10:
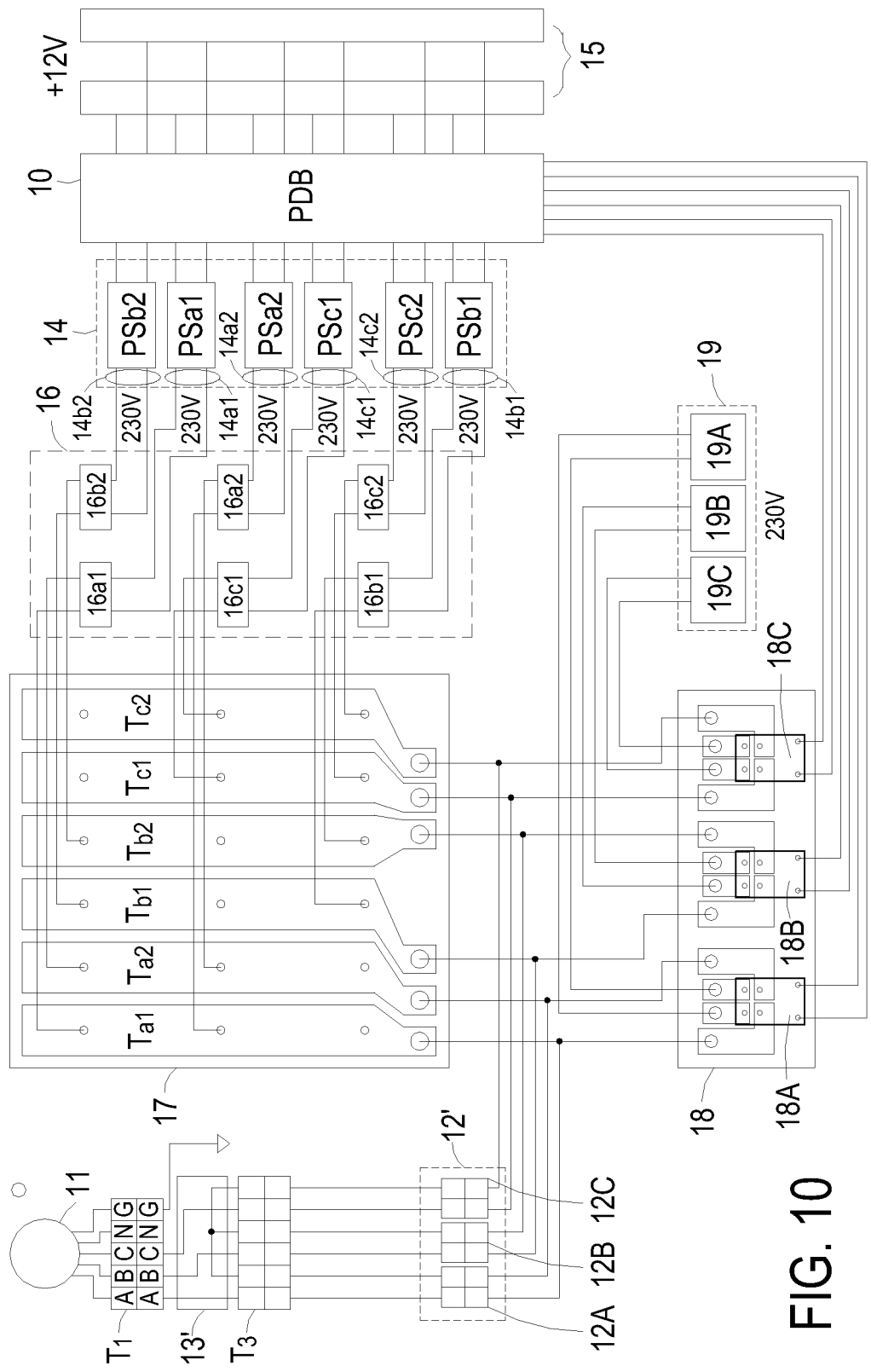
FIG. 10 is a schematic circuit diagram illustrating a power distribution unit for receiving diversified three-phase power or single-phase power according to another second embodiment of the present invention.

FIG. 10 is a schematic circuit diagram illustrating a power distribution unit for receiving diversified three-phase power or single-phase power according to another second embodiment of the present invention. The configurations and the operation principles of the power distribution unit (PDU) 1 of FIG. 10 are similar to those shown in FIGS. 9 and 2, and are not redundantly described herein. In this embodiment, the input power is 230/400 volt (3-phase, 4-pole, 5-wire) in a Y-connection configuration. In this embodiment, the wiring block 13' is a second-type wiring block. By means of the second-type wiring block 13', the input ends of the three power output assemblies 14 are connected in a Y configuration. As such, by the second-type wiring block 13', the voltages transmitted to the input ends of the first, second and third power output assemblies 14 are equal to the first phase voltage $V_{AN}$ (=230 volt), the second phase voltage $V_{BN}$ (=230 volt) and the third phase voltage $V_{CN}$ (=230 volt), respectively.

The voltage difference between any two of the first terminal A, the second terminal B and the third terminal C for the fourth fixed terminal block T4 is 400 volt. However, voltages transmitted to the input ends of the first, second and third power output assemblies are equal to the first phase voltage $V_{AN}$ (=230 volt), the second phase voltage $V_{BN}$ (=230 volt) and the third phase voltage $V_{CN}$ (=230 volt), respectively. Likewise, the voltages transmitted to the first accessory power receptacle 19A, the second accessory power receptacle 19B and the third accessory power receptacle 19C are equal to the first phase voltage $V_{AN}$, the second phase voltage $V_{BN}$ and the third phase voltage $V_{CN}$ of the input power, respectively.

Figure 11:
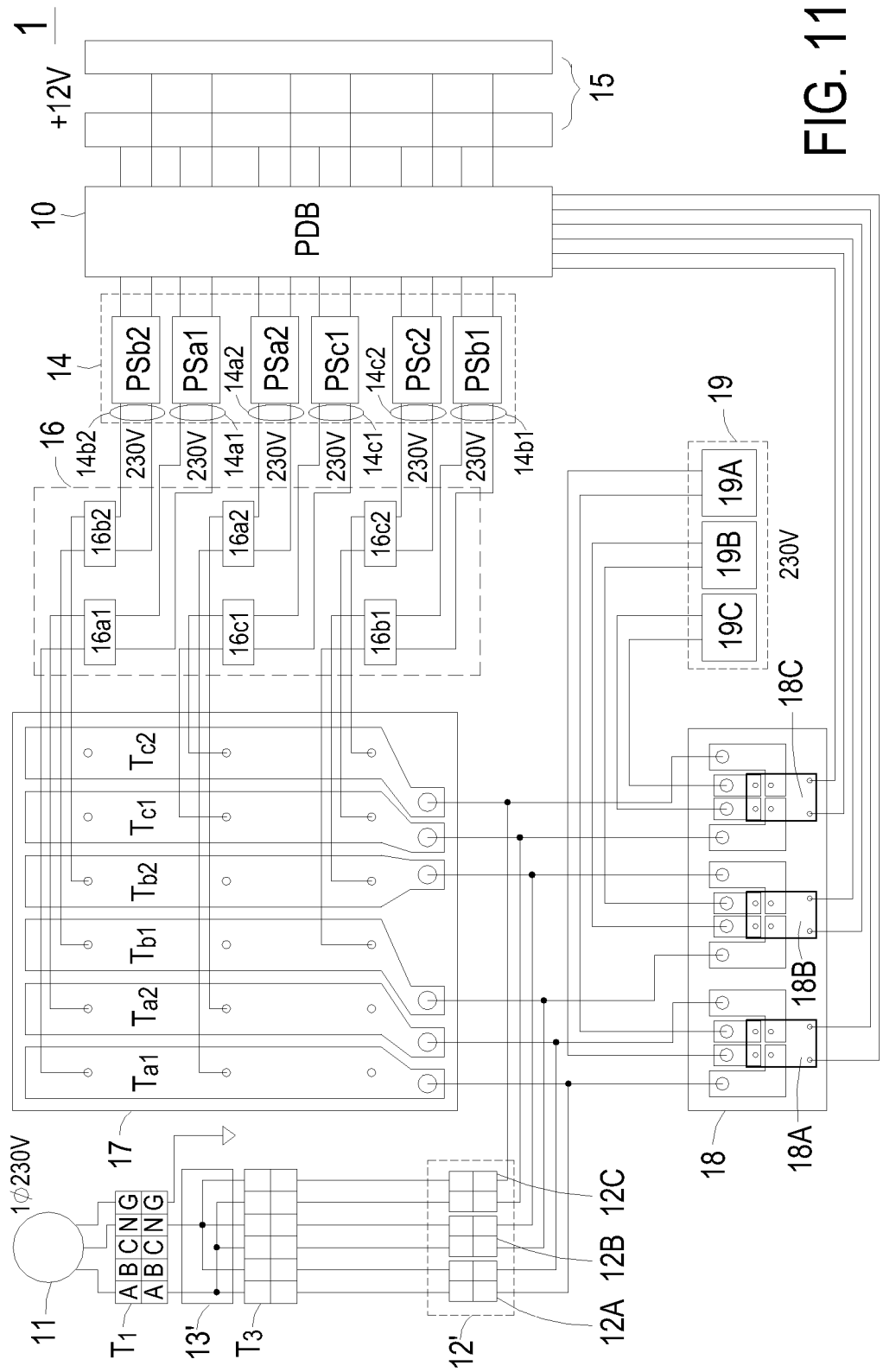
FIG. 11 is a schematic circuit diagram illustrating a power distribution unit for receiving diversified three-phase power or single-phase power according to another third embodiment of the present invention.

FIG. 11 is a schematic circuit diagram illustrating a power distribution unit for receiving diversified three-phase power or single-phase power according to another third embodiment of the present invention. The configurations and the operation principles of the power distribution unit (PDU) 1 of FIG. 11 are similar to those shown in FIG. 9 and FIG. 3, and are not redundantly described herein. In this embodiment, the input power is 230 volt (1-phase, 2-pole, 3-wire). Correspondingly, the power cord 11 has three wires. The three input wires of the power cord 11 are respectively connected to the first terminal A, the neutral terminal N and the equipment ground terminal G of the fourth fixed terminal block T4. In this embodiment, the wiring block 13' is a third-type wiring block. By means of the third-type wiring block 13', the input ends of the three power output assemblies 14 are connected with each other in parallel. In addition, by means of the third-type wiring block 13', the voltages transmitted to the input ends of the first, second and third power output assemblies 14 are equal to the voltage difference between the first terminal A and the neutral terminal N of the fourth fixed terminal block T4. That is, a wiring voltage is equal to 230 volt. Likewise, the voltages transmitted to the first accessory power receptacle 19A, the second accessory power receptacle 19B and the third accessory power receptacle 19C are equal to the voltage difference between the first terminal A and the neutral terminal N of the fourth fixed terminal block T4.

Figure 12:
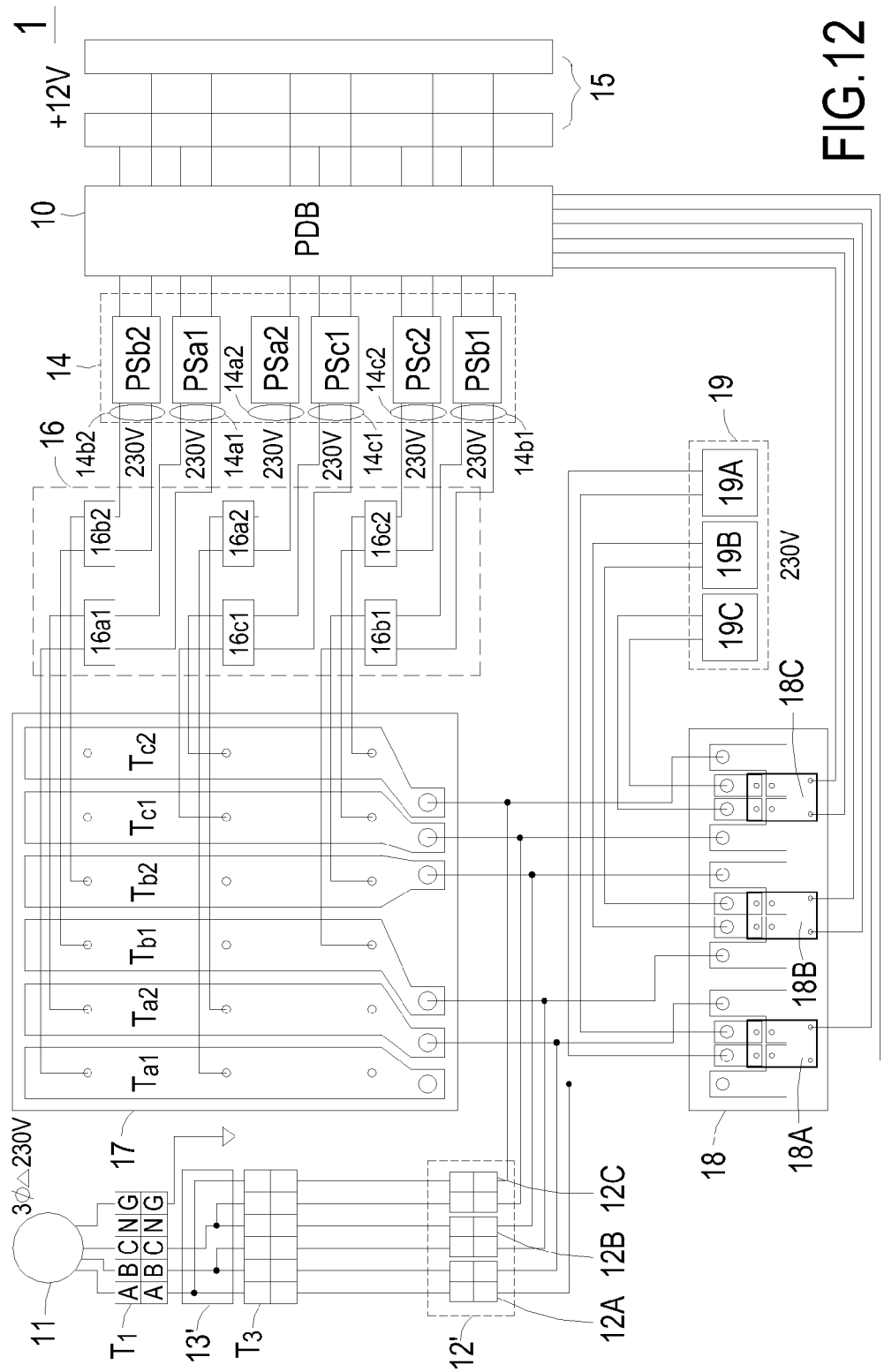
FIG. 12 is a schematic circuit diagram illustrating a power distribution unit for receiving diversified three-phase power or single-phase power according to another fourth embodiment of the present invention.

FIG. 12 is a schematic circuit diagram illustrating a power distribution unit for receiving diversified three-phase power or single-phase power according to another fourth embodiment of the present invention. The configurations and the operation principles of the power distribution unit (PDU) 1 of FIG. 12 are similar to those shown in FIG. 9 and FIG. 4, and are not redundantly described herein. In this embodiment, the input power is 230 volt (3-phase, 3-pole, 4-wire) in a delta-connection configuration. Correspondingly, the power cord 11 has four wires. The four input wires of the power cord 11 are respectively connected to the first terminal A, the second terminal B, the third terminal C and the equipment ground terminal G of the fourth fixed terminal block T4. That is, the voltage difference between any two of the first terminal A, the second terminal B and the third terminal C for the fourth fixed terminal block T4 is 230 volt. In this embodiment, the wiring block 13' is also the first-type wiring block. By means of the first-type wiring block 13', the input ends of the three power output assemblies 14 are connected in a delta (or Δ) configuration. In addition, by means of he first-type wiring block 13', the voltages transmitted to the input ends of the first, second and third power output assemblies 14 are equal to the first wiring voltage $V_{AB}$ (=230 volt), the second wiring voltage $V_{BC}$ (=230 volt) and the third wiring voltage $V_{CA}$ (=230 volt) of the input power, respectively. Likewise, by means of the first-type wiring block 13', the voltages transmitted to the first accessory power receptacle 19A, the second accessory power receptacle 19B and the third accessory power receptacle 19C are equal to the first wiring voltage $V_{AB}$, the second wiring voltage $V_{BC}$ and the third wiring voltage $V_{CA}$ of the input power, respectively.

Figure 13:
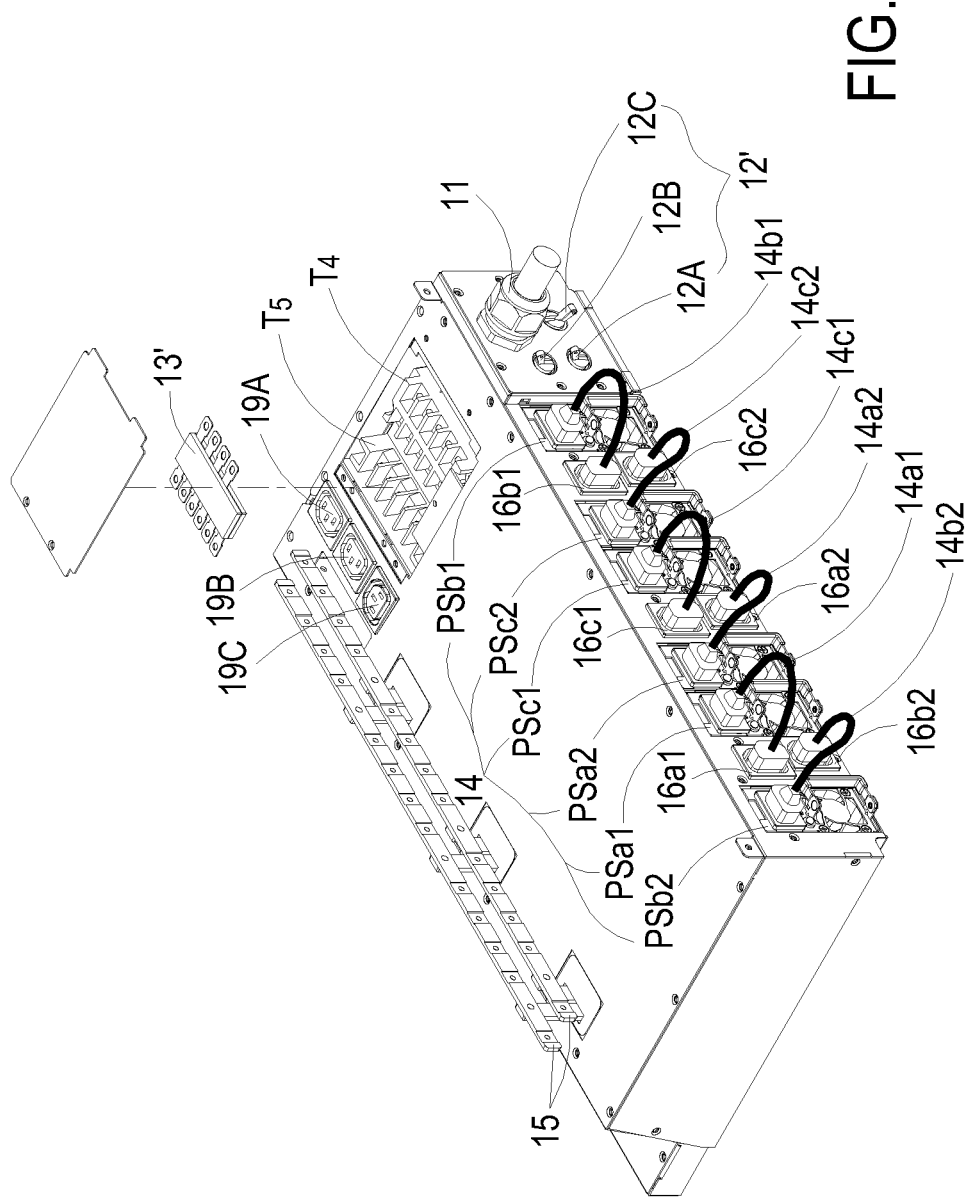
FIG. 13 is a schematic perspective view illustrating a power distribution unit for receiving diversified three-phase power or single-phase power according to another embodiment of the present invention.

FIG. 13 is a schematic perspective view illustrating a power distribution unit for receiving diversified three-phase power or single-phase power according to another embodiment of the present invention. Please refer to FIGS. 5 and 9~12. The configurations of the power distribution unit (PDU) 1 of FIG. 13 are similar to those shown in FIG. 5, and are not redundantly described herein. In comparison with the power distribution unit (PDU) 1 of FIG. 5, the installing positions and the arrangement relationships of the breakers 12A~12C, the accessory power receptacles 19A~19C and the wiring block 13' included in the power distribution unit 1 of FIG. 13 are different from that of the PDU 1 of FIG. 5. In this embodiment, the power distribution unit 1 is electrically connected to a utility power supply source (not shown) through the power cord 11, so that the input power (utility power) provided by the utility power supply source could be transmitted to the power distribution unit 1. The input power is then transmitted to the six power supply apparatuses of the three power output assemblies 14 through the fourth fixed terminal block T4, the wiring block 13', the fifth fixed terminal block T5 and the breaker unit 12'. The electric energy of the input power is received by the power output assemblies 14 and converted into output power. The wiring block 13' is interconnected between the fourth fixed terminal block T4 and the fifth fixed terminal block T5 for determining the values of voltage transmitted to the input ends of the power output assemblies 14 and the accessory power receptacles 19.

By manually turning on or turning off the breaker unit 12', the power distribution unit 1 is selectively enabled or disabled. If the power distribution unit 1 is in an over-current condition, the breaker unit 12' will be automatically open to interrupt the circuit in order to protect the power distribution unit 1.

For complying with a variety of utility power specifications, the power cord 11 and the wiring block 13' of the power distribution unit 1 are separable. By means of a fastening element (e.g. a screw), the power cord 11 is fixed onto the fourth fixed terminal block T4. Alternatively, the wiring block 13' could be fixed between the fourth fixed terminal block T4 and the fifth fixed terminal block T5. By replacing the power cord 11 and a corresponding wiring block 13', the power distribution unit 1 could receive the utility power according to a variety of utility power specifications. In some embodiments, the power cord 11 and the wiring block 13' may have engaging elements for facilitating assembling the power cord 11 and the wiring block 13'.

Moreover, the input ends of the power supply apparatuses are connected with respective power receptacles through respective power wires, so that the input ends of the three power output assemblies 14 are connected with the wiring block 13'. By selecting a proper type of wiring block 13', the input ends of the three power output assemblies 14 are connected in a delta configuration or a Y configuration, or connected with each other in parallel. As a consequence, the voltages transmitted to the input ends of the three power output assemblies 14 are within the acceptable ranges of the three power output assemblies 14.

In this embodiment, the rated current values of the components included in respective circuit loop are 10A. For example, the rated current value of each input terminal of the power supply apparatuses PSa1, PSb1, PSc1, PSa2, PSb2 and PSc2 is 10A, the rated current value of each power cord 14a1, 14b1, 14c1, 14a2, 14b2, 14c2 is 10A, and the rated current value of each power receptacle 16a1, 16b1, 16c1, 16a2, 16b2, 16c2 is 10A. In addition, the rated current value of the selected breaker 12 of FIGS. 1~5 must be 10A so as to protect the components included in respective circuit loop. However, the rated current values of the selected breakers 12A~12C of FIGS. 10~14 can be 20A or 10A so as to protect the components included in respective circuit loop.

FIG. 14 is a schematic perspective view illustrating an exemplary first-type wiring block used in the power distribution unit of FIG. 9 or FIG. 12. As shown in FIG. 14, the first-type wiring block 13' comprises a first-side first pin 13A', a first-side second pin 13B', a first-side third pin 13C', a second-side first pin 13A1', a second-side second pin 13B1', a second-side third pin 13C1', a second-side fourth pin 13B2', a second-side fifth pin 13A2', and a second-side sixth pin 13C2'. The first-side first pin 13A', the second-side first pin 13A1' and the second-side sixth pin 13C2' are coupled with each other. The first-side second pin 13B', the second-side second pin 13B1' and the second-side fifth pin 13A2' are coupled with each other. The first-side third pin 13C', the second-side third pin 13C1' and the second-side fourth pin 13B2' are coupled with each other. After the first side and the second side of the first-type wiring block 13' are respectively and directly fixed and coupled to the fourth fixed terminal block T4 and the fifth fixed terminal block T5, the input ends of the three power output assemblies 14 are connected in a delta configuration.

FIG. 15 is a schematic perspective view illustrating an exemplary second-type wiring block used in the power distribution unit of FIG. 10. As shown in FIG. 15, the second-type wiring block 13' comprises a first-side first pin 13A', a first-side second pin 13B', a first-side third pin 13C', a first-side neutral pin 13N', a second-side first pin 13A1', a second-side second pin 13B1', a second-side third pin 13C1', a second-side fourth pin 13B2', a second-side fifth pin 13A2', and a second-side sixth pin 13C2'. The first-side first pin 13A' is coupled with the second-side first pin 13A1'. The first-side second pin 13B' is coupled with the second-side second pin 13B1'. The first-side third pin 13C' is coupled with the second-side third pin 13C1'. The first-side neutral pin 13N' is coupled with the second-side fourth pin 13B2', the second-side fifth pin 13A2' and the second-side sixth pin 13C2'. After the first side and the second side of the first-type wiring block 13' are respectively and directly fixed and coupled to the fourth fixed terminal block T4 and the fifth fixed terminal block T5, the input ends of the three power output assemblies 14 are connected in a Y configuration.

FIG. 16 is a schematic perspective view illustrating an exemplary third-type wiring block used in the power distribution unit of FIG. 11. As shown in FIG. 16, the third-type wiring block 13' comprises a first-side first pin 13A', a first-side neutral pin 13N', a second-side first pin 13A1', a second-side second pin 13B1', a second-side third pin 13C1', a second-side fourth pin 13B2', a second-side fifth pin 13A2', and a second-side sixth pin 13C2'. The first-side first pin 13A' is coupled with the second-side first pin 13A1', the second-side second pin 13B1' and the second-side third pin 13C1'. The first-side neutral pin 13N' is coupled with the second-side fourth pin 13B2', the second-side fifth pin 13A2' and the second-side sixth pin 13C2'. After the first side and the second side of the first-type wiring block 13' are respectively fixed and coupled to the fourth fixed terminal block T4 and the fifth fixed terminal block T5, the input ends of the three power output assemblies 14 are connected with each other in parallel.

From the above description, the power distribution unit of the present invention is capable of receiving diversified three-phase power or single-phase power, so that the power distribution unit is applied to a variety of utility power specifications. According to the utility power specification (AC input power), a desired power distribution unit is assembled by replacing the power cord and a corresponding wiring block.

In a case that a power distribution unit has a breakdown, the maintenance worker only needs to replace the power cord and the wiring block without re-designing the power distribution unit. Therefore, the maintenance cost and complexity are reduced.

Moreover, the manufactures may produce one kinds of power distribution unit. The power distribution unit could comply with different utility power specifications by changing the power cord and a corresponding wiring block. Since the components other than the power cord and the wiring block are unchanged, the complexity of assembling the power distribution units and the fabricating cost are both reduced.

In the above embodiments, the power supply apparatuses PSa1, PSb1, PSc1, PSa2, PSb2 and PSc2 of the power distribution unit 1 are single-phase power supply apparatuses with simple circuitry. For example, the power supply apparatuses PSa1, PSb1, PSc1, PSa2, PSb2 and PSc2 are general power supply apparatuses (180~264 volt). As a consequence, the cost and circuitry complexity of fabricating the power distribution unit will be reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power distribution unit for receiving diversified three-phase power or single-phase power, said power distribution unit comprising:
    a separable power cord for receiving electric energy of input power;
    a separable wiring block electrically connected with said power cord for providing at least one connection configuration;
    a first fixed terminal block;
    a second fixed terminal block;
    a first input power delivering PCB connected with a third fixed terminal block of said power distribution unit;
    a first power receptacle assembly connected to said first input power delivering PCB;
    a second power receptacle assembly connected to said first input power delivering PCB; and
    a third power receptacle assembly connected to said first input power delivering PCB;
    wherein first, second and third power output assemblies of said power distribution unit have respective power input ends connected with said first, second and third power receptacle assemblies through power wires;
    wherein said connection configuration provided by one side of said wiring block comprises a delta configuration, a Y configuration or a parallel configuration.

2. The power distribution unit according to claim 1, further comprising said first, second and third power output assemblies for converting said input power into output power, and wherein said first power output assembly, said second power output assembly and said third power output assembly have respective input ends connected to said wiring block, so that said input ends of said first, second and third power output assemblies are connected in said delta configuration or said Y configuration or connected with each other in parallel to form said parallel configuration.

3. The power distribution unit according to claim 2 wherein said first power output assembly, said second power output assembly and said third power output assembly comprises a first power supply assembly, a second power supply assembly and a third power supply assembly, respectively, wherein said first power supply assembly, said second power supply assembly and said third power supply assembly have respective input ends connected to said wiring block, so that said input ends of said first, second and third power supply assemblies are connected in said delta configuration or said Y configuration or connected with each other in parallel.

4. The power distribution unit according to claim 3 wherein each of said first power supply assembly, said second power supply assembly and said third power supply assembly comprises at least one power supply apparatus.

5. The power distribution unit according to claim 3 wherein each of said first power supply assembly, said second power supply assembly and said third power supply assembly comprises at least one single-phase power supply apparatus.

6. The power distribution unit according to claim 2 wherein when said input ends of said first, second and third power output assemblies are connected in said delta configuration, a wiring voltage of said input power is transmitted to said input ends of said first, second and third power output assemblies.

7. The power distribution unit according to claim 2 wherein when said input ends of said first, second and third power output assemblies are connected in said Y configuration, a phase voltage of said input power is transmitted to said input ends of said first, second and third power output assemblies.

8. The power distribution unit according to claim 2 wherein when said input ends of said first, second and third power output assemblies are connected with each other in parallel, a wiring voltage of said input power is transmitted to said input ends of said first, second and third power output assemblies.

9. The power distribution unit according to claim 2, further comprising a breaker connected between said power cord and said wiring block for preventing from an over-current condition of said power distribution unit.

10. The power distribution unit according to claim 9 further comprising:
said first fixed terminal block interconnected between said power cord and said breaker for fixing said power cord;
said second fixed terminal block interconnected between said breaker and said wiring block for fixing said wiring block; and
said third fixed terminal block interconnected between said wiring block and said input ends of said first, second and third power output assemblies for fixing said wiring block.

11. The power distribution unit according to claim 1 wherein said first input power delivering PCB comprises a first conducting trace, a second conducting trace, a third conducting trace, a fourth conducting trace, a fifth conducting trace, and a sixth conducting trace, which are respectively connected to six contacts of said third fixed terminal block.

12. The power distribution unit according to claim 11 wherein said first power receptacle assembly is connected with said first conducting trace and said fourth conducting trace, said second power receptacle assembly is connected with said second conducting trace and said fifth conducting trace, and said third power receptacle assembly is connected with said third conducting trace and said sixth conducting trace.

13. The power distribution unit according to claim 10 further comprising:
an accessory power receptacle; and
a second input power delivering PCB interconnected between said accessory power receptacle and said third fixed terminal block, and comprising a switch element, wherein when said switch element is conducted, said electric energy of said input power is transmitted to said accessory power receptacle through said second input power delivering PCB.

14. The power distribution unit according to claim 13 wherein a voltage of said input power transmitted to said accessory power receptacle through said second input power delivering PCB is determined according to said wiring block.

15. The power distribution unit according to claim 13 wherein said switch element is a relay or a transistor.

16. The power distribution unit according to claim 2 further comprising a bus bar connected with output ends of said first, second and third power output assemblies.

17. The power distribution unit according to claim 16 further comprising a power distribution board interconnected between said bus bar and said output ends of said first, second and third power output assemblies.

18. The power distribution unit according to claim 2 wherein said power cord and said wiring block are fixed by screwing or engaging means.

19. The power distribution unit according to claim 2 further comprising:
a fourth fixed terminal block interconnected between said power cord and said wiring block for fixing said power cord; and
a fifth fixed terminal block interconnected between said wiring block and said input ends of said first, second and third power output assemblies for fixing said wiring block.

20. The power distribution unit according to claim 19, further comprising a breaker unit interconnected between said fifth fixed terminal block and said input ends of said first, second and third power output assemblies for preventing from an over-current condition of said power distribution unit.

21. The power distribution unit according to claim 20 further comprising:
a first input power delivering PCB connected with said breaker unit;
a first power receptacle assembly connected to said first input power delivering PCB;
a second power receptacle assembly connected to said first input power delivering PCB; and
a third power receptacle assembly connected to said first input power delivering PCB,
wherein said first, second and third power output assemblies have respective power input ends connected with said first, second and third power receptacle assemblies through power wires.

22. The power distribution unit according to claim 21 wherein said first input power delivering PCB comprises a first conducting trace, a second conducting trace, a third conducting trace, a fourth conducting trace, a fifth conducting trace, and a sixth conducting trace, which are respectively connected to a corresponding terminal of three breakers of said breaker unit.

23. The power distribution unit according to claim 20 further comprising:
an accessory power receptacle; and
a second input power delivering PCB interconnected between said accessory power receptacle and said breaker unit.

* * * * *